(12) United States Patent  
Masuyama et al.

(10) Patent No.: US 12,488,898 B2
(45) Date of Patent: Dec. 2, 2025

(54) DISEASE EVALUATION INDEX CALCULATION METHOD, APPARATUS, SYSTEM, AND PROGRAM, AND MODEL CREATION METHOD FOR CALCULATING DISEASE EVALUATION INDEX

(71) Applicant: JAPAN AGRICULTURAL FRONTIER DEVELOPMENT ORGANIZATION, Tokyo (JP)

(72) Inventors: Hiroaki Masuyama, Tokyo (JP); Kazumi Hasuko, Kashiwa (JP); Shozo Motokawa, Shiki (JP)

(73) Assignee: JAPAN AGRICULTURAL FRONTIER DEVELOPMENT ORGANIZATION, Tokyo (JP)

( * ) Notice: Subject to any disclaimer, the term of this patent is extended or adjusted under 35 U.S.C. 154(b) by 665 days.

(21) Appl. No.: 17/181,152

(22) Filed: Feb. 22, 2021

(65) Prior Publication Data

US 2021/0174967 A1 Jun. 10, 2021

Related U.S. Application Data

(63) Continuation of application No. PCT/JP2019/032698, filed on Aug. 21, 2019.

(30) Foreign Application Priority Data

Aug. 23, 2018 (JP) ................................. 2018-156379

(51) Int. Cl.
*G16H 50/30* (2018.01)
*G01N 33/483* (2006.01)
(Continued)

(52) U.S. Cl.
CPC ......... *G16H 50/30* (2018.01); *G01N 33/4833* (2013.01); *G16H 10/20* (2018.01);
(Continued)

(58) Field of Classification Search
CPC ........ G16H 50/30; G16H 10/20; G16H 10/40; G16H 10/60; G16H 15/00; G16H 50/70;
(Continued)

(56) References Cited

U.S. PATENT DOCUMENTS 10,920,283 B2 * 2/2021 Gordon .................. C12Q 1/689
11,410,757 B2 * 8/2022 Li .......................... G16H 20/60
(Continued)

FOREIGN PATENT DOCUMENTS

| JP | 2015-533213 A | 11/2015 |
| JP | 2017-029133 A | 2/2017 |
| WO | WO 2016/033439 A2 | 3/2016 |

OTHER PUBLICATIONS

Structural Equation Modeling: Reviewing the Basics and Moving Forward by Jodie B. Ullman, Journal of Personality Assessment, 87(1), 35-50, published 2012 (Year: 2012).*

(Continued)

*Primary Examiner* — Sun M Li
(74) *Attorney, Agent, or Firm* — Potomac Law Group, PLLC

(57) ABSTRACT

A technique for calculating a disease evaluation index using intestinal flora is presented. A disease evaluation index calculation method includes a step of inputting one or more diseases that a user wants to be aware of; a step of extracting the user's intestinal flora data, which is a result of analyzing a stool sample of the user in advance, the user's attribute data, and an association model having a plurality of subjects' attribute data, the subjects' intestinal flora data, which is a result of analyzing stool samples of the subjects, and data on the diseases as internal factors, from a database; and a step of calculating a risk of the diseases using the user's intestinal flora data, the user's attribute data, and the association model.

17 Claims, 11 Drawing Sheets

(51) Int. Cl.
*G16H 10/20* (2018.01)
*G16H 10/40* (2018.01)
*G16H 10/60* (2018.01)
*G16H 15/00* (2018.01)
*G16H 50/70* (2018.01)
*G16H 70/60* (2018.01)

(52) U.S. Cl.
CPC .............. *G16H 10/40* (2018.01); *G16H 10/60* (2018.01); *G16H 15/00* (2018.01); *G16H 50/70* (2018.01); *G16H 70/60* (2018.01)

(58) Field of Classification Search
CPC ........ G16H 70/60; G16H 50/50; G16H 50/20; G01N 33/4833; C12Q 1/04; C12Q 1/689
See application file for complete search history.

(56) References Cited

U.S. PATENT DOCUMENTS

| | | | |
|---|---|---|---|
| 2003/0009356 A1* | 1/2003 | Hildebrand | G16H 40/67 705/2 |
| 2007/0118398 A1* | 5/2007 | Perls | G16H 10/20 600/300 |
| 2014/0271561 A1 | 9/2014 | Pimentel et al. | |
| 2016/0326574 A1 | 11/2016 | Gordon et al. | |
| 2018/0211727 A1* | 7/2018 | Zarkoob | G06N 20/10 |
| 2018/0342322 A1* | 11/2018 | Apte | G16H 20/00 |
| 2019/0043618 A1* | 2/2019 | Vaughan | G16H 20/10 |

OTHER PUBLICATIONS

NPL, Clustering Coef for correlation network, arXiv_1806.10228v1 [physics.soc-ph] Jun. 26, 2018, (Year: 2018).*

Kimura D, Nakatani K, Takeda T, Fujita T, Sunahara N, Inoue K, Notoya M. Analy of causal relationships by structural equation modeling to determine the factors influencing cognitive function in elderly people in JP.PLoS One. Feb. 6, 2015;10(2):e0117554. doi: 10.1371/journal.pone.0117554. PMID: 25658829 (Year: 2015).*

Lahti et al., "Tipping elements in the human intestinal ecosystem", Nature Communications, Article No. 4344 (2014), Jul. 8, 2014, DOI: 10.1038/ncomms5344.

Wu et al., "Comparative analysis of microbiome measurement platforms using latent variable structural equation modeling", BMC Bioinformatics, Mar. 5, 2013, DOI: 10.1186/1471-2105/14:79.

Office Action issued Sep. 25, 2018, in Japanese Patent Application No. 2018-156379.

Office Action issued Feb. 26, 2019, in Japanese Patent Application No. 2018-156379.

Extended European Search Report issued Sep. 13, 2021, in European Patent Application No. 19852082.7.

* cited by examiner

Fig. 4

| Framework concept | No. | Question items |
|---|---|---|
| [1] Attribute | 1 | Attributes |
| [2] Living / Home Environment (Lifestyle) | 2-1 | Family structure |
| | 2-2 | Fitness exercises |
| | 2-3 | Smoking / Non-smoking conditions |
| | 2-4 | ... |
| [3] Dietary awareness | 3-1 | Food preferences |
| | 3-2 | Awareness of food safety |
| | 3-3 | ... |
| [4] Diet behavior | 4-1 | Breakfast, lunch, dinner, etc. |
| | 4-2 | Eating probiotic products |
| | 4-3 | ... |
| [5] Psychological burden (Stress) | 5-1 | Psychological burden (Stress) |
| | 5-2 | ... |
| [6] Taking medicines | 6-1 | Medicines |
| | 6-2 | Supplements |
| | 6-3 | ... |
| [7] Diseases / Pre-symptomatic diseases (Health conditions) | 7-1 | Stool sample |
| | 7-2 | Diseases |
| | 7-3 | Physical conditions |
| | 7-4 | Female-specific |
| | 7-5 | ... |

Fig. 5

| Diseases | Constitution | Total (number) | Male (number) | Female (number) |
|---|---|---|---|---|
| Population | All subjects | 3,000 | 1,500 | 1,500 |
| None (Health population) | Group answering NO "under treatment" | 300 | 150 | 150 |
| Atopic Dermatitis | Group answering "under treatment" for Atopic Dermatitis | 30 | 16 | 14 |
| Atopic Dermatitis and Asthma | Group answering "under treatment" for Atopic Dermatitis and Asthma | 10 | 8 | 2 |
| Asthma | Group answering "under treatment" for Asthma | 40 | 25 | 15 |
| ... | ... | ... | ... | ... |

α, β, γ: Parameters of Structural equation

DISEASE EVALUATION INDEX CALCULATION METHOD, APPARATUS, SYSTEM, AND PROGRAM, AND MODEL CREATION METHOD FOR CALCULATING DISEASE EVALUATION INDEX

TECHNICAL FIELD

The invention relates to techniques for calculating a disease evaluation index using intestinal flora, and techniques for providing an evaluation report that shows a risk of a specific disease to a person based on a stool sample submitted by the person and the person's attributes provided via answers to questionnaires.

BACKGROUND

The intestinal flora (also called "intestinal microbiome" or "gut microbiome") is an extremely complex ecosystem which is composed of a large number of bacteria. The bacteria are said to exceed hundreds to thousands of species. The task of culturing, observing, identifying, and analyzing the intestinal flora requires an enormous amount of effort and time. In recent years, molecular biology techniques have made it possible to solve some of these problems. These techniques use a method for detecting a difference in the sequence of a bacterial gene, particularly a 16SrRNA gene (16SrDNA).

Such techniques are progressing the research on the relationship between intestinal flora and specific diseases. In Non-Patent Document 1, for example, after a large number of subjects submit their stool samples collected with stool collection kits and provide their health information, such as age and BMI (Body Mass Index), a relationship between specific bacterial groups and ages and/or BMIs of the subjects is evaluated using multiple logistic regression analysis, in order to determine the prevalence of a disease using intestinal flora information. Non-Patent Document 2 discloses modeling of structural equations using information on the intestinal flora. This structural equation modeling has been studied for the purpose of evaluating a method for analyzing the intestinal flora (Next Generation Sequence, etc.), not a disease.

RELATED ART

Non-Patent Documents

Non-Patent Document 1: Lahti et al., Tipping elements in the human intestinal ecosystem, nature, NATURE COMMUNICATIONS 5, Article number: 4344 (2014), Published: 8 Jul. 2014.

Non-Patent Document 2: Wu et al., Comparative analysis of microbiome measurement platforms using latent variable structural equation modeling, BMC Bioinformatics 2013 14:79, Published 5 Mar. 2013.

SUMMARY

Technical Problem

The prior art techniques do not provide for a practical way to evaluate the risk of the subject getting some kind of disease, based on the information of the subject's own intestinal flora. Therefore, despite submitting a stool sample, if a subject wishes to evaluate the risk of developing a specific disease, that service is not being provided for the subject (hereinafter referred to as a user).

One or more embodiments of the instant invention focus on solving such a problem. An object of the invention is to provide a technique for calculating a disease evaluation index using intestinal flora.

Solution to Problem

The first embodiment is a model creation method for calculating a disease evaluation index, using a computer. The method includes inputting one or more diseases; extracting attribute data, intestinal flora data and disease data of healthy people and people with diseases, from a first database that stores the intestinal flora data, which is a result of analyzing stool samples of a plurality of subjects, and a second database that stores the attribute data and the disease data of the subjects; and creating an association model having the attribute data, the intestinal flora data and the disease data as internal factors.

The second embodiment is the model creation method of the first embodiment, wherein the intestinal flora data is used as one or more of the internal factors.

The third embodiment is the model creation method of the first embodiment, wherein the association model is a structural equation model.

The fourth embodiment is the model creation method of the first embodiment, wherein the second database further stores living data and environment data of the subjects; and adding the attribute data of the subjects and the living data and the environment data of the subjects to the internal factors.

The fifth embodiment is the model creation method of the first embodiment, wherein creating the association model, includes selecting the intestinal flora related to the disease; setting the selected intestinal flora to an observation variable of the association model; and estimating data on the intestinal flora, which is the internal factor of the association model.

The sixth embodiment is the model creation method of the first embodiment, wherein creating the association model, includes using a disease risk coefficient table.

The seventh embodiment is the model creation method of the sixth embodiment, wherein the disease risk coefficient table relates to a path between predetermined intestinal flora and a predetermined disease and/or health condition at a predetermined attribute.

The eighth embodiment is a model creation program for calculating a disease evaluation index, executed by a computer. The program includes a step of inputting one or more diseases; a step of extracting attribute data, intestinal flora data and disease data of healthy people and people with diseases, from a first database that stores the intestinal flora data, which is a result of analyzing stool samples of a plurality of subjects, and a second database that stores the attribute data and the disease data of the subjects; and a step of creating an association model having the attribute data, the intestinal flora data and the disease data as internal factors.

The ninth embodiment is a disease evaluation index calculation method, using a computer. The method includes inputting one or more diseases that a user wants to be aware of; extracting the user's intestinal flora data, which is a result of analyzing a stool sample of the user in advance, the user's attribute data, and, an association model having a plurality of subjects' attribute data, the subjects' intestinal flora data, which is a result of analyzing stool samples of the subjects, and data on the diseases as internal factors, from a database; and calculating a risk of the diseases using the user's intestinal flora data, the user's attribute data, and the association model.

The tenth embodiment is the disease evaluation index calculation method of the ninth embodiment, wherein the intestinal flora data is used as one or more of the internal factors.

The eleventh embodiment is the disease evaluation index calculation method of the ninth embodiment, wherein the association model is a structural equation model.

The twelfth embodiment is the disease evaluation index calculation method of the ninth embodiment, wherein the internal factor has the attribute data of the subjects and the living data and the environment data of the subjects.

The thirteenth embodiment is a disease evaluation index calculation apparatus. The apparatus includes an input unit configured to input one or more diseases that a user wants to be aware of; an extraction unit configured to extract the user's intestinal flora data, which is a result of analyzing a stool sample of the user in advance, the user's attribute data, and, an association model having a plurality of subjects' attribute data, the subjects' intestinal flora data, which is a result of analyzing stool samples of the subjects, and data on the diseases as internal factors, from a database; and a calculation unit configured to calculate a risk of the diseases using the user's intestinal flora data, the user's attribute data, and the association model.

The fourteenth embodiment is a disease evaluation index calculation apparatus. The apparatus includes an input unit configured to input one or more diseases that a user wants to be aware of; a first extraction unit configured to extract the user's intestinal flora data, which is a result of analyzing a stool sample of the user in advance, from a first database, and to extract the user's attribute data from a second database; a second extraction unit configured to extract a plurality of subjects' intestinal flora data, which is a result of analyzing stool samples of the subjects including healthy people and people with diseases, from the first database, and to extract the subjects' attribute data and the subjects' disease data, from a second database; a creation unit configured to create an association model having the subjects' attribute data, the subjects' intestinal flora data, and data on the diseases as internal factors; and a calculation unit configured to calculate a risk of the diseases using the user's intestinal flora data, the user's attribute data, and the association model.

The fifteenth embodiment is a program for calculating a disease evaluation index, executed by a computer. The program includes an input step of inputting one or more diseases that a user wants to be aware of; a first extraction step of extracting the user's intestinal flora data, which is a result of analyzing a stool sample of the user in advance, from a first database, and to extract the user's attribute data from a second database; a second extraction step of extracting a plurality of subjects' intestinal flora data, which is a result of analyzing stool samples of the subjects including healthy people and people with diseases, from the first database, and to extract the subjects' attribute data and the subjects' disease data, from the second database; a creation step of creating an association model having the subjects' attribute data, the subjects' intestinal flora data, and data on the diseases as internal factors; and a calculation step of calculating a risk of the diseases using the user's intestinal flora data, the user's attribute data, and the association model.

Advantage

One or more embodiments provide a technique for calculating a disease evaluation index using the intestinal flora.

BRIEF DESCRIPTION OF DRAWINGS

FIG. 4 is an explanatory diagram of the contents of a questionnaire in accordance with the embodiments.

FIG. 5 is an explanatory diagram of each group in accordance with the embodiments.

DETAILED DESCRIPTION OF EMBODIMENTS

Figure 1:
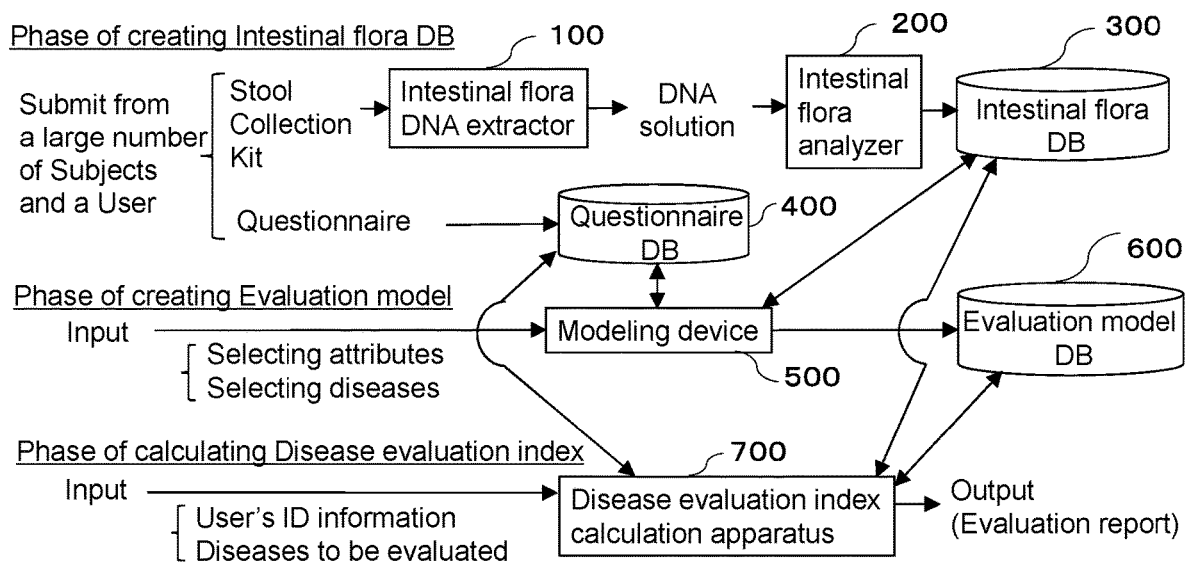
FIG. 1 is a block diagram of a disease evaluation index calculation system in accordance with one or more embodiments.

One or more embodiments of the invention are described with reference to the drawings.

The same reference numerals are given to common parts in each figure, and duplicate description is omitted.

Disease Evaluation Index Calculation System

FIG. 1 is a block diagram of a disease evaluation index calculation system in accordance with one or more embodiments. The disease evaluation index calculation system includes a phase of creating an intestinal flora database (DB) from stool collection kits submitted by a large number of subjects and a user (a person who wishes, hopes or desires to evaluate the risk of one or more diseases), a phase of creating an evaluation model to evaluate the diseases (a specific disease), and a phase of calculating an evaluation index of the risk of the specific disease.

Phase of Creating Intestinal Flora DB

In the intestinal flora DB creation phase, thousands or more of subjects excrete their stools in toilets and collect their stool samples with stool collection kits. Next, an extractor who received the stool collection kits inputs the stool collection kits into an intestinal flora DNA extraction device 100, and outputs a DNA solution relating to the intestinal flora.

An analyst who received the DNA solution inputs the DNA solution into an intestinal flora analyzer 200 and analyzes the intestinal flora. The analyst stores the analysis result data of the intestinal flora in an intestinal flora DB 300.

Although the extractor and the analyst have been described separately, the same business operator may perform the extraction work and the analysis work.

Figure 2:
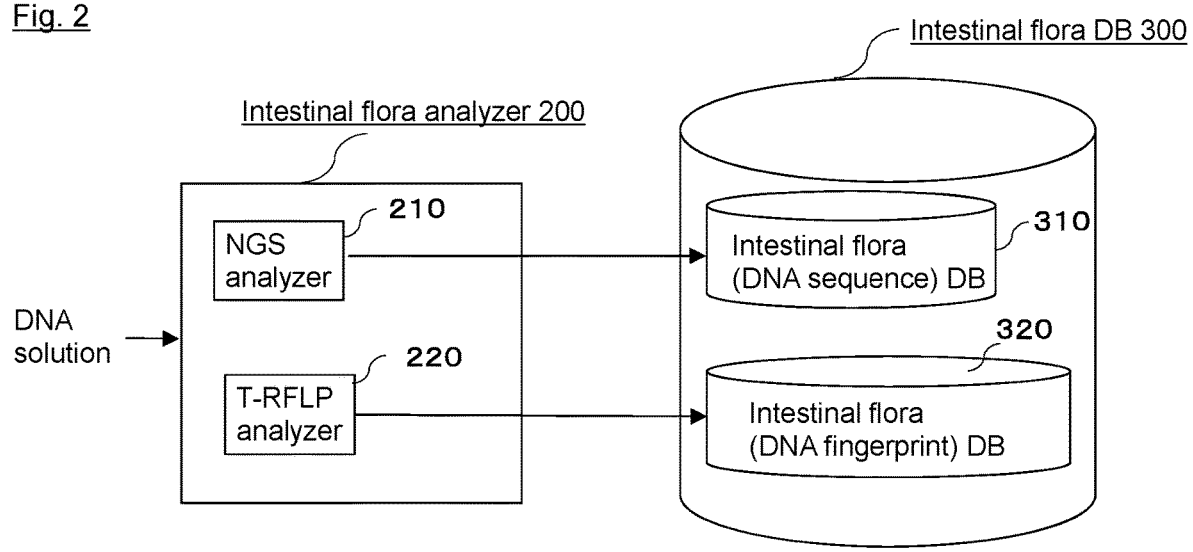
FIG. 2 is a block diagram of an intestinal flora analyzer 200 and an intestinal flora DB 300 in accordance with the embodiments.

FIG. 2 is a schematic configuration diagram of the intestinal flora analyzer 200 and the intestinal flora DB 300. In the embodiment, the intestinal flora analyzer 200 includes an NGS analyzer 210 and a T-RFLP analyzer 220 in order to prepare two types of methods for analyzing the intestinal flora from the DNA solution. The analyzer 200 may include at least one of the analyzers 210 or 220 and may analyze using one of them.

The DNA solution that has been exposed to a reagent preparation and dispensing operation in advance is input into the NGS analyzer 210. The analyzer 210 analyzes the DNA solution using a Next Generation Sequencer (NGS) and outputs a DNA sequence related to the intestinal flora. The DNA sequence is stored in intestinal flora (DNA sequence) DB 310. The NGS is able to perform flora classification by sequence, and analyze the relative amount of flora for each fungal classification.

The DNA solution that has been exposed to a reagent preparation and dispensing operation in advance is input into the T-RFLP analyzer 220. A capillary DNA sequencer analyzes the DNA solution using Terminal-Restriction Fragment Length Polymorphism (T-RFLP) and outputs a DNA fingerprint related to the intestinal flora. The DNA fingerprint is stored in an intestinal flora (DNA fingerprint) DB 320. The T-RFLP is able to perform flora classification based on DNA fragment length (OTU), and analyze the relative amount of flora for each OTU. OTU is called an Operational Taxonomic Unit and is classified into groups such as "A193", however the actual name of the genus is unknown. In addition, "A" of "A193" is an abbreviation for a restriction enzyme [A/u I]. The restriction enzyme cleaves the DNA.

The intestinal flora DB 300 includes an intestinal flora (DNA sequence) DB 310 and an intestinal flora (DNA fingerprint) DB 320. These two types of DBs (310 and 320) store the analysis results of the above-mentioned two types of analysis devices (210 and 220) respectively. When one of the two types of analyzers (210 or 220) is included in the intestinal flora analyzer 200, the corresponding DB (310 or 320) may be included in the intestinal flora DB 300. The above-mentioned database structure can treat the analysis results as one database, even when the intestinal flora of several thousand or more subjects are analyzed by different methods. Then, the intestinal flora DB 300 associates the ID (Identification number) information of each subject with the intestinal flora of the subject.

Next, a large number of subjects who submitted the stool collection kits fill out questionnaires and submit them to a questionnaire collector. The questionnaire collector stores the questionnaire results in a questionnaire DB 400. At the early stage of collecting the questionnaires, there are small numbers of questionnaire results stored in the questionnaire DB 400. An external questionnaire DB may be used as the questionnaire DB 400. Similarly, an external intestinal flora DB may be used as the intestinal flora DB 300, since there are small numbers of data stored in the intestinal flora DB 300 at the early stage of collecting the stool collection kits.

Phase of Creating Evaluation Model

In the evaluation model creation phase, first of all, the evaluation model creator selects the attributes and diseases to be evaluated. A model creation device (or modeling device) 500 includes input unit that inputs the selected attributes and diseases, an extraction unit that extracts the ID information of the subjects related to these attributes and diseases from the questionnaire DB 400, and the creation unit that creates an evaluation model using a creation method described below. The model creation device 500 stores the created evaluation model in an evaluation model DB 600.

Phase of Calculating Disease Evaluation Index

In the disease evaluation index calculation phase, the evaluator requests a user, who wishes to submit the user's stool sample collected by the stool collection kits and to evaluate the risk of a specific disease, to submit the user's stool sample explained in the intestinal flora DB creation phase and to fill out the user's questionnaire explained in the evaluation model creation phase. The user's stool collection kit and questionnaire are processed in the same way as the stool collection kit and questionnaire of the large number of subjects, and are stored in the intestinal flora DB 300 and the questionnaire DB 400. Furthermore, the evaluator inputs a specific disease that the user wishes to evaluate and the user's ID information to a disease evaluation index calculation apparatus 700.

The disease evaluation index calculation apparatus 700 includes an input unit that receives input information, an extraction unit that extracts information related to the input information, a calculation unit that calculates the evaluation index, and an output unit that outputs an evaluation report (or an assessment report). The input unit accepts input of the specific disease and the user's ID information as the input information. The extraction unit extracts information related to the user's ID information from the external questionnaire DB 400 and the intestinal flora DB 300. The extracted information are the user's factors and the user's intestinal flora. The extraction unit also extracts an evaluation model for the specific disease from the evaluation model DB 600. Then, the disease evaluation index calculation apparatus 700 inputs the user's factors (attributes, lifestyle, etc.) and the user's intestinal flora to the evaluation model of the specific disease, and calculates the risk evaluation index for the specific disease. An evaluation report is output based on the calculated evaluation index. Although business operators who perform each phase have been described separately, the same business operator may perform all phases.

Figure 3:
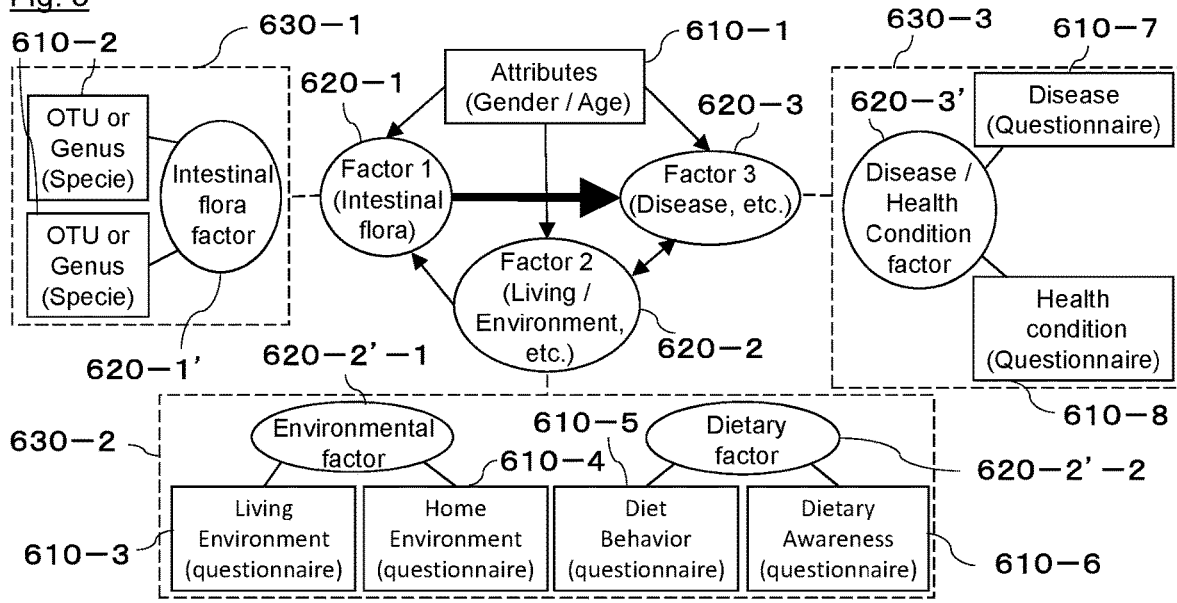
FIG. 3 is a conceptual diagram of an evaluation model in accordance with the embodiments.

FIG. 3 is a conceptual diagram for explaining an example of the evaluation model stored in the evaluation model DB 600. The evaluation model is a statistical analysis model constructed by observation variables that have a certain degree of correlation with a specific disease and latent variables (hereinafter referred to as factors) related to the observation variables. In this evaluation model, primary factors (main causes) are also treated as factors.

Observation variables are represented by solid rectangles and factors are represented by ellipses. Each observation variable is a part of the information of the intestinal flora DB 300 or the questionnaire DB 400 in FIG. 1.

The main parts of the evaluation model include Attributes (gender/age) 610-1 as observation variables, and Factor 1 (intestinal flora) 620-1, Factor 2 (living/environment, etc.) 620-2 and another Factor 3 (disease, etc.) 620-3 as factors. The attributes (gender/age) 610-1 are part of the information of the questionnaire DB 400. The direction of the arrow defines the "direction of influencing a target". Although the thick arrow from Factor 1 (intestinal flora) 620-1 to Factor 3 (disease, etc.) 620-3 is unidirectional, it is also possible to construct a bidirectional evaluation model.

Next, the factors are described in detail below. The rectangle 630-1 surrounded by the dotted line shows the details of the Factor 1 (intestinal flora) 620-1. The Factor 1 (intestinal flora) 620-1 can be degraded to an Intestinal flora factor 620-1' and a plurality of "OTUs or genera (species)" 610-2. A plurality of "OTUs or genera (species)" 610-2 are observation variables and are part of the information of the intestinal flora DB 300 of FIG. 1.

The rectangle 630-2 surrounded by the dotted line shows the details of the Factor 2 (living, environment, etc.) 620-2. The Factor 2 (living/environment, etc.) 620-2 is divided into two groups. One group includes Environmental factor 620-2'-1, Living environment (questionnaire) 610-3 and Home environment (questionnaire) 610-4. The other group includes Dietary factor 620-2'-2, Diet behavior (questionnaire) 610-5 and Dietary awareness (questionnaire) 610-6. The Living environment (questionnaire) 610-3, the Home environment (questionnaire) 610-4, Diet behavior (questionnaire) 610-5 and Dietary awareness (questionnaire) 610-6 are observation variables, and are part of the information in the questionnaire DB 400 in FIG. 1.

The rectangle 630-3 surrounded by the dotted line shows the details of the Factor 3 (disease, etc.) 620-3. The Factor 3 (disease, etc.) 620-3 is divided into Disease and/or Health condition factor 620-3', Disease (questionnaire) 610-7, and Health condition (questionnaire) 610-8. The Disease (questionnaire) 610-7 and the Health condition (questionnaire) 610-8 are observation variables and are part of the information in the questionnaire DB 400 in FIG. 1.

When the user is assigned to a group divided by attributes (gender/age) 610-1 and each questionnaire (between 610-3 and 610-8) and the group possesses the Factor 1 (Intestinal flora) 620-1, FIG. 3 conceptually expresses that it is possible to calculate whether the risk of the specific disease that the user wants to evaluate is high or low. The risk of the specific disease means the probability (including the possibility) of currently suffering from or having the specific disease in the future.

That is, when "OTU or Genus (Specie)" 610-2, Attributes (gender/age) 610-1, Living environment (questionnaire) 610-3, Home environment (questionnaire) 610-4, Diet behavior (questionnaire) 610-5, Dietary awareness (questionnaire) 610-6, Disease (questionnaire) 610-7 and Health condition (questionnaire) 610-8 are selected as observation variables that have a certain degree of correlation with the specific disease, the evaluation model is constructed by the factors related to these observation variables.

In Attributes 610-1, populations to be statistically analyzed are divided by Gender, and Gender and Age are used as observation variables. "OTU or genus (specie) name" 610-2 is used as an observation variable of the Intestinal flora factor 620-1'. This is because OTU is used when the DNA fingerprint is known by T-RFLP, and a genus (specie) name is used when the DNA sequence is known by NGS.

FIG. 4 is an explanatory diagram of the contents of the questionnaire in accordance with the embodiment. Framework concepts of the questionnaires are "attribute", "living and/or home environment (lifestyle)", "dietary awareness", "diet behavior", "psychological burden (Stress)", "taking medicines", "diseases and/or pre-symptomatic diseases (Health conditions)", and each question item corresponding to these concepts is one or more. "7-3 physical conditions" also includes health conditions judged from physical conditions. In case of atopic dermatitis, for example, the health conditions are itching and redness of the skin, or blood pressure that is measured by the user. Hereinafter, for the sake of simplifying the explanation, "diseases and/or pre-symptomatic diseases (Health conditions)" may be referred to as "Diseases", and "living and/or home environment (Lifestyle)", "dietary awareness", "diet behavior", "psychological burden (Stress)" and "taking medicines" may be collectively referred to as "Life and Environment".

FIG. 5 is an explanatory diagram of each group in accordance with the embodiment. A group of "Population" is composed of all subjects. A group of "None (Health population)" is composed of subjects answering NO "under treatment." A group of "Atopic Dermatitis" is composed of subjects answering "under treatment" for Atopic Dermatitis. A group of "Atopic Dermatitis and Asthma" is composed of subjects answering "under treatment" for Atopic Dermatitis and Asthma. A group of "Asthma" is composed of subjects answering "under treatment" for Asthma.

The First Embodiment

Embodiment 1: Case of Evaluating Disease Risk From Attributes and Intestinal Flora In the first embodiment, the case of evaluating the disease risk is described using attributes (gender and/or age) as observation variables, and the Factor 1 (Intestinal flora) and the Factor 3 (disease, etc.) as factors. The observation variables and the factors are the main parts of the evaluation model described in FIG. 3.

Figure 6:
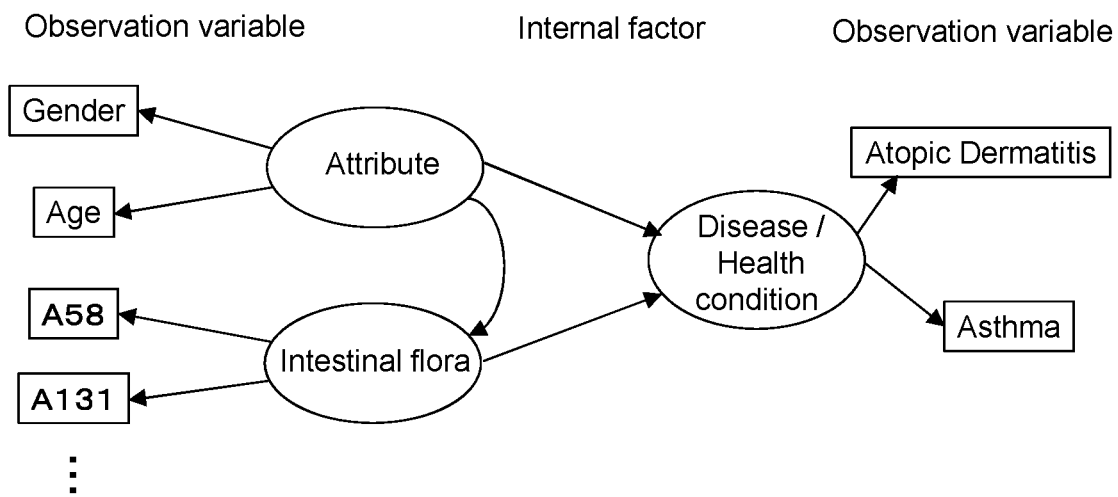
FIG. 6 is a schematic view of an evaluation model in accordance with the first embodiment.

FIG. 6 is a schematic view of the evaluation model in accordance with the first embodiment. The evaluation model of the first embodiment is a model for calculating a risk evaluation index for the diseases "Atopic Dermatitis" or "Asthma". The observation variables "Gender" and "Age" are extracted from the questionnaire submitted by the subjects. The observation variables "A58", "A131", etc. are extracted from the stool collection kits submitted by the subjects. In addition, the observation variables "Atopic Dermatitis" and "Asthma" are diseases that the user wants to evaluate. By using this evaluation model, it is possible to calculate an evaluation index of the risk that the user is developing (or getting) "Atopic Dermatitis" and "Asthma".

The internal factors of the evaluation model of the first embodiment are "Attribute", "Intestinal flora" and "Disease and/or Health condition". The relationship between these internal factors is expressed as a relational model (association model or linkage model) in the schematic configuration of the evaluation model. In this embodiment, covariance structure analysis is adopted as an analysis method for statistically evaluating various relationships between these observation variables and internal factors. The relationship between the observation variables and the internal factors shown in FIG. 6 and the relationship between the internal factors are expressed by a Structural Equation Modeling (SEM), and an evaluation model is created.

The relationship between the internal factors and the observation variables is as follows. The observation variables of the internal factor "Attribute" are "Gender" and "Age". The observation variables of the internal factor "Intestinal flora" are OTUs such as "A58" and "A131". The observation variables of the internal factor "Disease and/or Health condition" are "Atopic Dermatitis" and "Asthma". Hereinafter, for the sake of simplifying the explanation, the internal factor "Disease and/or Health condition" may be referred to as the internal factor "Disease".

Figure 7:
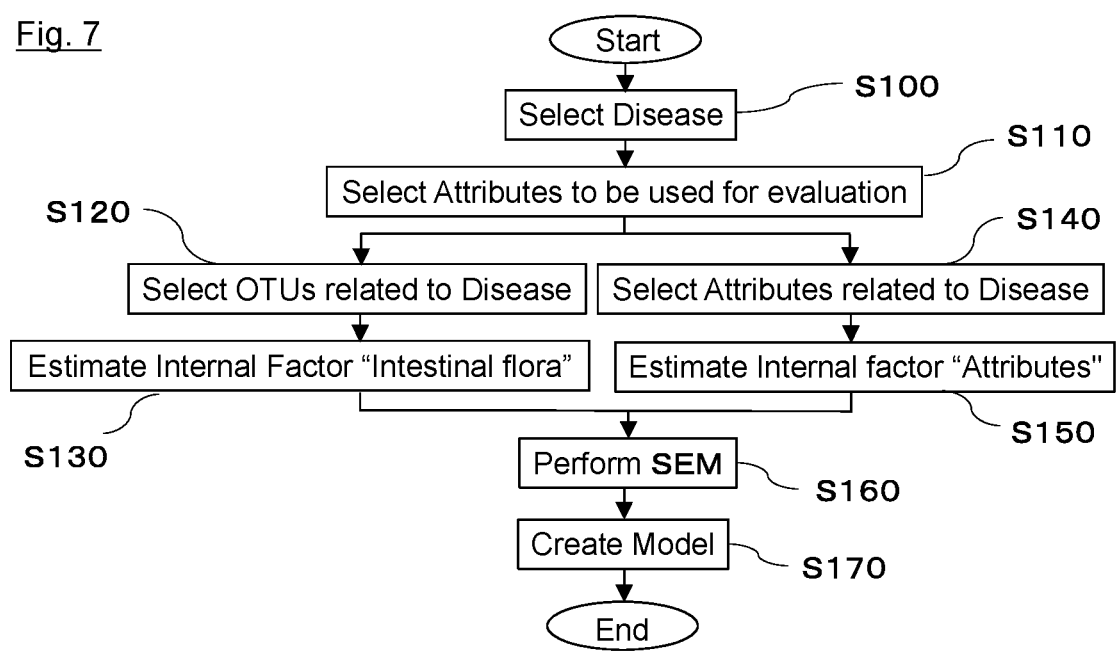
FIG. 7 is a flowchart of creating an evaluation model in accordance with the first embodiment.

FIG. 7 is a flowchart for creating an evaluation model in accordance with the first embodiment. In this embodiment, "Atopic Dermatitis" and "Asthma" are described as examples of the diseases. However, for other diseases such as "Heart disease", "Colon cancer", "Gastrointestinal disease", "Liver disease", "Kidney disease", "Diabetes", "High blood pressure", "Dyslipidemia", "Low body weight (BMI)", "Obesity (BMI)", "Bone disease", "Joint pain", "Depression", etc. evaluation model are created in the same way.

In the first step, "Atopic Dermatitis" and "Asthma" are selected as diseases (S100). Using "Gender" and "Age" is selected as attributes to be used for evaluation (S110).

Next, one or more OTUs that are strongly related to the disease "Atopic Dermatitis" is selected (S120). This selection may be based on, for example, logistic regression analysis. In case of selecting an OTU that is strongly related to a predetermined disease by logistic regression analysis, a disease risk coefficient table is used. The table is composed of a path between a predetermined intestinal flora and a predetermined disease and/or health condition, the coefficient of the path, an odds ratio and p-values (significance probability) at the time of a predetermined attribute.

Next, the internal factor "intestinal flora" of the evaluation model is estimated using the selected OTUs as observation variables (S130). This estimation may be based on, for example, factor analysis, or may be based on other analysis methods such as principal component analysis and principal coordinate analysis. The disease "Asthma" is performed in the same processes (S120 and S130).

In parallel with S120 (regardless of time), attributes, as internal factors of the evaluation model, related to the disease "Atopic Dermatitis" are selected from the disease risk coefficient table (S140). Then, the internal factor "Attribute" of the evaluation model is estimated for the selected attribute (S150). This estimation may be based on, for example, factor analysis, or may be based on other analytical methods such as principal component analysis and principal coordinate analysis. The disease "Asthma" is performed in the same processes (S140 and S150).

SEM analysis is performed using the internal factor "Intestinal flora" estimated in S130, the internal factor "Attribute" estimated in S140, and the internal factor "Disease and/or Health condition" (S160).

Figure 8:
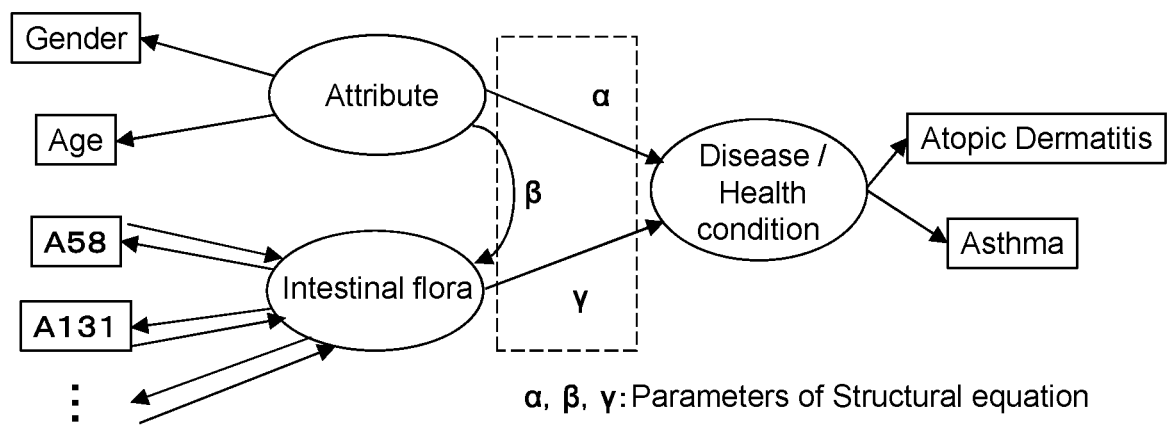
FIG. 8 is a schematic explanatory view of a model in the case of covariance structure analysis in accordance with the first embodiment.

The parameters $\alpha$, $\beta$, and $\gamma$ of the structural equation shown in FIG. 8 are obtained from the SEM analysis, and then an evaluation model is created based on the parameters (S170).

Figure 9:
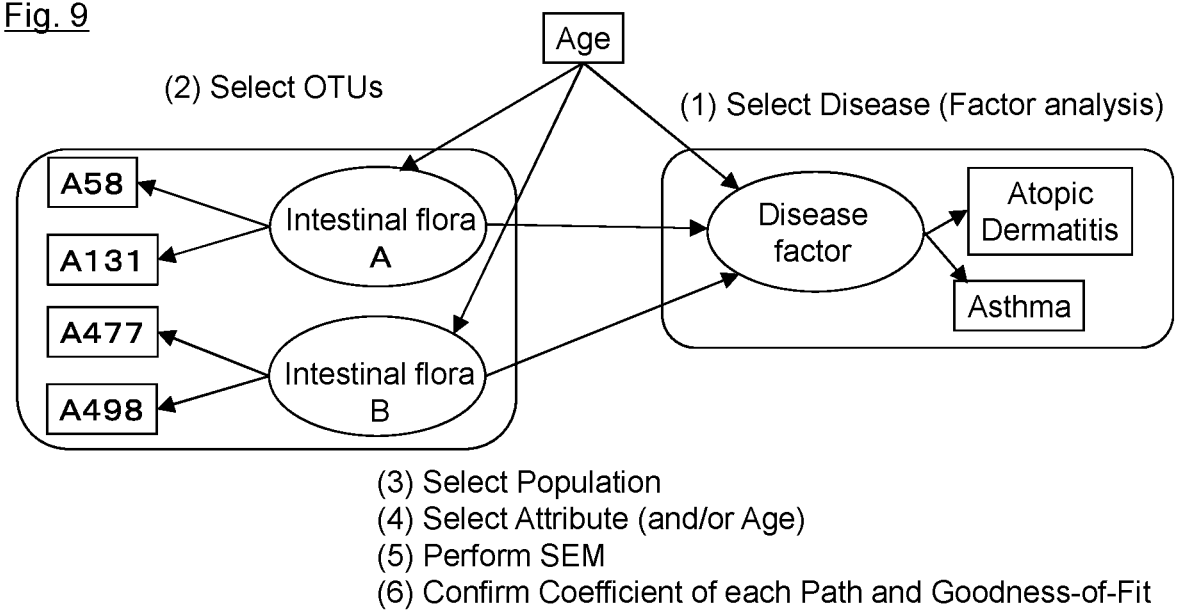
FIG. 9 is an explanatory diagram of a part of the evaluation model creation flowchart in accordance with the first embodiment.

FIG. 9 is an explanatory diagram of a part (S120) of the evaluation model creation flowchart in accordance with the first embodiment. Steps of the process to select an OTU from the disease risk factor table for a specific disease are described as below.

Step (1) determines one or more diseases. In FIG. 9, the diseases are referred to as "Atopic Dermatitis" and "Asthma". Step (2) selects one or more OTUs from the coefficient table. In the figure, "A58", "A131", "A477", "A498", etc. are shown, but in reality, the dimensions of each OTU are about 40 to 100 dimensions.

Step (3) selects a population from each group (or population) described in FIG. 5. Step (4) selects "Age" as a predetermined attribute. Each group (or population) shown in FIG. 5 is divided into male only, female only, and the whole (or total) in advance, and "Age" is selected in order to construct an evaluation model for each population. Step (5) performs SEM analysis. Step (6) confirms the coefficient of each path and the goodness-of-fit of the model. That is, if they are higher than or equal to a predetermined threshold value, the process ends.

Figure 10:
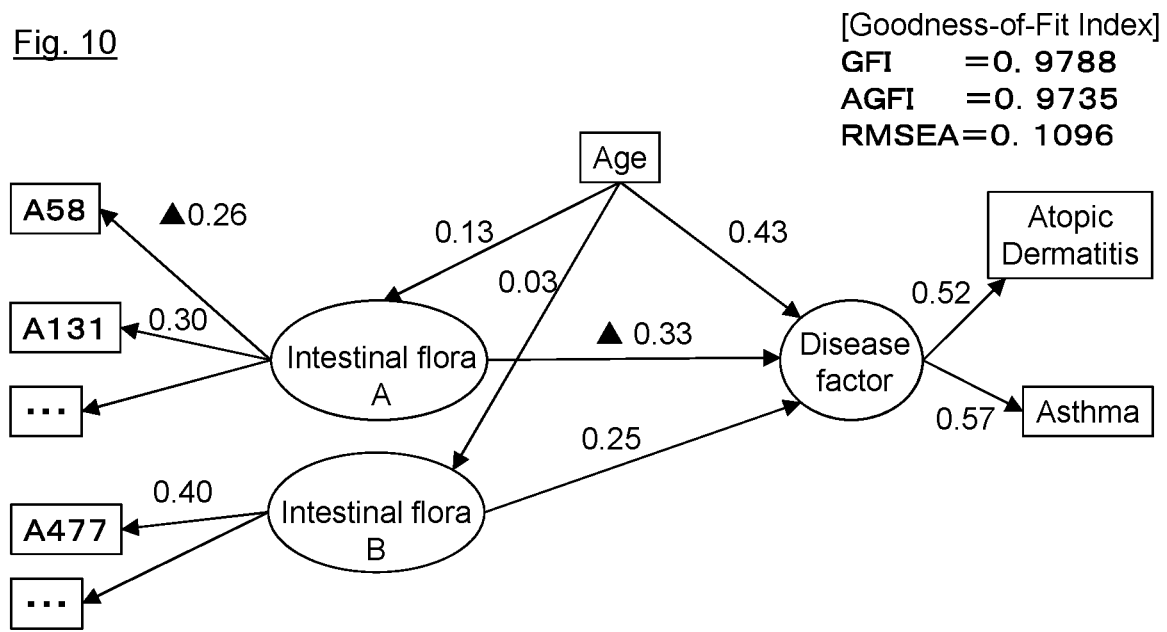
FIG. 10 shows an example diagram of the evaluation model in accordance with the first embodiment.

FIG. 10 shows an example diagram of the evaluation model in the case of "Atopic Dermatitis" and "Asthma" in accordance with the first embodiment. The direction of the arrow of each path indicates the direction of influencing a target. If the numerical value of each path is closer to "1", the degree of positive correlation is higher, that is, it is shown that the arrow is a high factor that influences the target. On the contrary, the triangle marks painted in black are negative values, indicating a negative correlation.

According to the specific example of the evaluation model of FIG. 10, as for the diseases "Atopic Dermatitis" and "Asthma", when some subject has a high "Age" and has much flora belonging to "A131", it is evaluated that if the "Age" is higher, it is more likely to get "Atopic Dermatitis" and "Asthma", because "Age" is a positive correlation with "Disease factor".

However, since "A131" and "Intestinal flora A" have a positive correlation, it means that "Intestinal flora A" is high. Since "Atopic Dermatitis" and "Asthma" are a positive correlation with "Disease factor", and "Intestinal flora A" and "Disease factor" have a negative correlation, it is evaluated that if "Intestinal flora A" is higher, it is more resistant to get "Atopic Dermatitis" and "Asthma".

It is noted that the path from "Age" to "Disease factor" has a direct path or an indirect path via "Intestinal flora A". According to the direct path, as mentioned above, if the "Age" is older, it is more likely to get "Atopic Dermatitis" and "Asthma". On the contrary, according to the indirect path, as the "Age" is older, "Intestinal flora A" is also slightly higher, and then it is more resistant to get "Atopic Dermatitis" and "Asthma". Considering the indirect path as the described above, it is evaluated that the influence of the older the "Age" on more resistant to get "Atopic Dermatitis" and "Asthma" is actually small.

The evaluation model has three types of the goodness-of-fit indexes. GFI is an abbreviation for Goodness-of-Fit Index, AGFI is an abbreviation for Adjusted GFI, and RMSEA is an abbreviation for Root Mean Square Error of Approximation. If the values of GFI and AGFI are closer to "1", the evaluation model is fitter for the data (hereinafter referred to as goodness-of-fit). On the contrary, if the value of RMSEA is smaller, than the goodness-of-fit is higher. The evaluation model may use error variance, which is an index of error variation.

The goodness-of-fit index of the evaluation model of FIG. 10 shows "GFI=0.9788, AGFI=0.9735, RMSEA=0.1096". Therefore, it is shown that the goodness-of-fit of this evaluation model is high.

Effects

According to the first embodiment, an evaluation model for evaluating disease risk is created from attributes and intestinal flora. That is, this embodiment creates a model for evaluating the relationship of the thick arrow from Factor 1 (Intestinal flora) 620-1 to Factor 3 (Disease, etc.) 620-3 in FIG. 3. In addition, since various relationships between observation variables and internal factors are modeled as explained in FIG. 6, an evaluation model that judges (or indicates) both direct paths and indirect paths are created as explained in FIG. 10.

When a user collects the user's stool sample with stool collection kit, submits the sample and answer the user's questionnaire, the user receives the evaluation report that says that the sample has high contained amount of "A131". The report furthermore says that the user's body has resistance against getting "Atopic Dermatitis" and "Asthma", because the effect of age on "Atopic Dermatitis" and "Asthma" is small and the user has high amount of "Intestinal flora A".

Then, the disease evaluation index calculation apparatus 700 receives user ID information from a user who desires to evaluate the risk of getting the diseases "Atopic Dermatitis" and "Asthma". The apparatus 700 extracts the information (the user's attributes and information on the user's intestinal flora) relating to the user ID information from the questionnaire DB 400 and the intestinal flora DB 300, and extracts the evaluation model of the diseases "Atopic Dermatitis" and "Asthma" from the evaluation model DB 600. The disease evaluation index calculation apparatus 700 inputs the extracted user attributes (in this case, the user's age) and information on the intestinal flora (in this case, the user has a large amount of "A131") into the evaluation model of FIG. 10, and then the apparatus 700 calculates the evaluation index of the risk of "Atopic Dermatitis" and "Asthma". The apparatus 700 outputs an evaluation report based on the calculated evaluation index.

When the user reads the evaluation report, the user understands that the user has high amount of "A131", which has a large factor load on the intestinal flora A (Factor 1). The user furthermore understands that the effect of age on "Atopic Dermatitis" is small and the user's risk of getting "Atopic Dermatitis" and "Asthma" is low (even in the future when the user is older).

The effects on the business operator of the disease evaluation index calculation system are described below. If the high amount of "A131" in the intestinal flora reduces the risk of getting "Atopic Dermatitis" and "Asthma", the evaluation report suggests that by ingesting the actual flora contained in "A131" is possible to reduce the risk of "Atopic Dermatitis" and "Asthma". The business operator may design, study, and propose probiotics based on this possibility.

The Second Embodiment

Embodiment 2; Case of Evaluating Disease Risk From Attributes, Living and/or Environment, and Intestinal Flora The second embodiment describes a case of adding Factor 2 (living and/or environment, etc.) shown in FIG. 3 to the first embodiment, that is, the case where the disease risk is evaluated using all the main parts of the evaluation model shown in FIG. 3. The disease evaluation index calculation system of the second embodiment is the same as the block diagram shown in FIG. 1. The difference from the first embodiment is that Factor 2 (living and/or environment, etc.) is used in case of creating the evaluation model.

Figure 11:
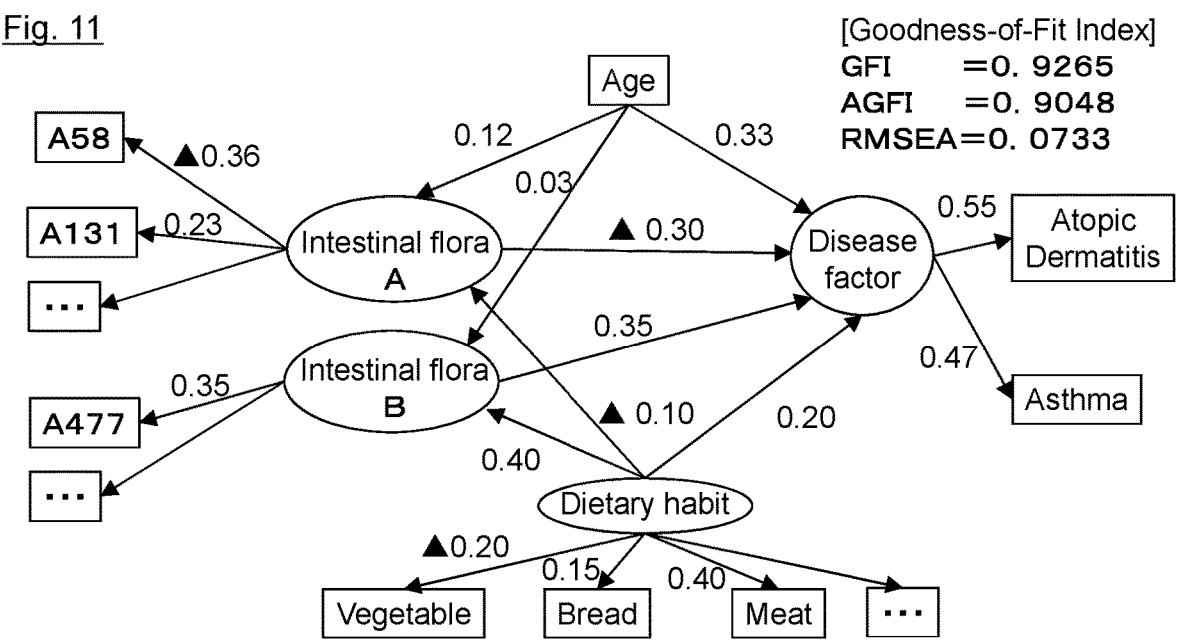
FIG. 11 shows an example diagram of the evaluation model in accordance with the second embodiment.

FIG. 11 shows an example diagram of the evaluation model in accordance with the second embodiment. The internal factor of the evaluation model specific to the second embodiment applies "Dietary habit" to Factor 2 (living/environment, etc.) in FIG. 3. The observation variables of the internal factor "Dietary habit" are "Milk", "Bread", "Meat", etc.

In order to add the observation variables "Milk", "Bread", "Meat", etc. to the evaluation model, it is necessary to add each question item of the framework concept "Diet behavior" shown in FIG. 4 to the questionnaire. Increasing the number of each question item makes it possible to make a more detailed evaluation.

According to the evaluation model shown in FIG. 11, a case when a subject frequently eats "Meat" means that the "Dietary habit" factor is high in addition to the interpretation of the first embodiment. This means that the "Intestinal flora A" factor is reduced, the "Intestinal flora B" factor is increased, and the "Disease factor" is increased. This "Disease factor" suggests an increased risk of getting "Atopic Dermatitis" and "Asthma". In addition, it is suggested that the high "Dietary habit" factor increases the "Intestinal flora B" factor, and that the high "Intestinal flora B" factor further increases the "Disease factor".

The goodness-of-fit index of the evaluation model of FIG. 11 shows "GFI=0.9265, AGFI=0.9048 and RMSEA=0.0738". Therefore, it is shown that the goodness-of-fit of this evaluation model is high.

According to the second embodiment, an evaluation model for evaluating disease risk is created from attributes, living and/or environment, etc. and intestinal flora. In the case of FIG. 11, an evaluation model for evaluating a risk of getting "Atopic Dermatitis" and "Asthma" is created from "Age", "Intestinal flora A", "Intestinal flora B" and "Dietary habit".

Then, the disease evaluation index calculation apparatus 700 receives user ID information from a user who desires to evaluate the risk of getting "Atopic Dermatitis" and "Asthma". The apparatus 700 extracts the information (the user's attributes, the result of the questionnaire on "Dietary habit" and information on the user's intestinal flora) relating to the user ID information from the questionnaire DB 400 and the intestinal flora DB 300, and extracts the evaluation model of the diseases "Atopic Dermatitis" and "Asthma" from the evaluation model DB 600. The disease evaluation index calculation apparatus 700 inputs the extracted user factors "Age", "Dietary habit" and information on the intestinal flora into the evaluation model of "Atopic Dermatitis" and "Asthma", and then the apparatus 700 calculates the evaluation index of the risk of "Atopic Dermatitis" and "Asthma".

When the user reads the evaluation report, in addition to the evaluation of the first embodiment, the evaluation report suggests that the user frequently eats "Meat", so that the "Intestinal flora A" factor decreases and the "Intestinal flora B" factor increases. Therefore, it increases the risk of getting "Atopic Dermatitis" and "Asthma". User also understand the detailed evaluation which suggests the possibility that the higher frequency of eating "Meat" increases the "Intestinal flora B" factor, which increases the risk of getting "Atopic Dermatitis" and "Asthma".

The evaluation report suggests the possibility below. When the user frequently eats "Meat" and does not frequently eat "Vegetables", it is possible to increases the risk of "Atopic Dermatitis" and "Asthma". On the contrary, if it reduces the frequency of eating "Meat" and also increases the frequency of eating "Vegetables", it is possible to reduce the risk of "Atopic Dermatitis" and "Asthma." The business operator may design, study, and propose probiotics based on this possibility.

The above-mentioned embodiments (including modified examples) of the invention have been described. Furthermore, two or more of the embodiments may be combined. Alternatively, one of the embodiments may be partially implemented. Furthermore, two or more of the embodiments may be partially combined.

Furthermore, embodiments of the invention are not limited to the description of the above embodiments. Various modifications are also included in the embodiments of the invention as long as a person skilled in the art can easily conceive without departing from the description of the embodiments.

For example, another analyzer such as qPCR may be used as the intestinal flora analyzer 200 of the embodiment. The qPCR analyzer inputs the DNA solution that has been exposed to a reagent preparation and dispensing operation in advance. Real-time quantitative PCR (quantitative Polymerase Chain Reaction) analyzes the DNA solution and outputs index flora relating to intestinal flora. The index flora is stored in intestinal flora (index flora) DB of the intestinal flora DB 300.

Furthermore, the embodiment uses the covariance structure analysis as a method for analyzing the association model, but other analysis methods, such as path analysis methods, may be used.

REFERENCE SIGN LIST

100 Intestinal flora DNA extractor
200 Intestinal flora analyzer
300 Intestinal flora DB
400 Questionnaire DB
500 Modeling device
600 Evaluation model DB
700 Disease evaluation index calculation apparatus

The invention claimed is:

1. A method for creating a model configured to determine a numerical value for a risk for a disease based on internal factors including intestinal flora data, the method comprising executing the following steps by a computer:
inputting one or more diseases for which the risk value is to be calculated into the computer;
extracting, as the internal factors:
intestinal flora data of people including healthy people and people with the one or more inputted diseases from a first database that stores intestinal flora data of a plurality of subjects, the intestinal flora data of the subjects having been obtained from analyzing stool samples of the subjects; and
attribute data of the people and disease data of the people from a second database that stores attribute data and disease data of the plurality of subjects;
determining direct and indirect paths between the internal factors, the paths representing direct and indirect relationships between the internal factors;
for each path, calculating a coefficient of the path, the coefficient of the path representing a degree of correlation between the internal factors;
for each path, confirming the coefficient of the path, the confirming including determining whether the coefficient of the path is above a predetermined threshold value;
determining influence of each internal factor on the risk for the disease based on the coefficients of the direct and indirect paths; and
associating a risk value for the disease for each path based on the determined influence,
the model being configured to determine the numerical value for the risk for the disease for a subject based on the subject's intestinal flora data and attribute data, and to generate an evaluation report for the subject that includes recommendations that affect the numerical value for the risk based on a combined influence of the internal factors on the risk for the disease.

2. The method of claim 1, wherein the model is a structural equation model.

3. The method of claim 1, wherein the second database further stores living data and environment data of the subjects; and
the method further comprises adding the living data and the environment data of the plurality of subjects to the internal factors.

4. The method of claim 1, wherein creating the model comprises:
selecting the extracted intestinal flora related to the one or more inputted diseases;
setting the selected intestinal flora to an observation variable of the model; and
estimating data on the extracted intestinal flora, which is the internal factor of the model.

5. The method of claim 1, wherein creating the model comprises:
using a disease risk coefficient table of the one or more inputted diseases.

6. The method of claim 5, wherein the disease risk coefficient table relates to a path between predetermined intestinal flora and a predetermined disease and/or health condition at a predetermined attribute.

7. The method of claim 1, wherein the healthy people are people answering NO under treatment in a questionnaire.

8. The method of claim 1, wherein the attribute data comprises at least one selected from a group consisting of gender and age.

9. The method of claim 1, wherein the one or more structural equation modeling include covariance structure analysis methods and/or a path analysis methods.

10. A non-transitory computer-readable storage medium upon which is embodied a sequence of programmed instructions for creating a model configured to determine a numerical value for a risk for a disease based on internal factors including intestinal flora data, which when executed by the computer, performs the following steps:
inputting one or more diseases for which the risk value is to be calculated into the computer;
extracting, as the internal factors, intestinal flora data of people including healthy people and people with the one or more inputted diseases from a first database that stores intestinal flora data of a plurality of subjects, and attribute data of the people and disease data of the people from a second database that stores attribute data and disease data of the subjects, the intestinal flora data of the subjects having been obtained from analyzing stool samples of the subjects;
determining direct and indirect paths between the internal factors, the paths representing direct and indirect relationships between the internal factors;
for each path, calculating a coefficient of the path, the coefficient of the path representing a degree of correlation between the internal factors;
for each path, confirming the coefficient of the path, the confirming including determining whether the coefficient of the path is above a predetermined threshold value;
determining influence of each internal factor on the risk for the disease based on the coefficients of the direct and indirect paths; and
associating a risk value for the disease for each path based on the determined influence,
the model being configured to determine the numerical value for the risk for the disease for a subject based on the subject's intestinal flora data and attribute data, and to generate an evaluation report for the subject that includes recommendations that affect the numerical value for the risk based on a combined influence of the internal factors on the risk for the disease.

11. A method for determining a numerical value for a risk for a disease, the method comprising executing the following steps by a computer:

inputting into the computer one or more diseases that a user wants to evaluate whether it is at risk for;

extracting the user's intestinal flora data and the user's attribute data from a database, the user's intestinal flora data being a result of analyzing a stool sample of the user;

extracting, from the database, a model that is configured to determine the numerical value for the risk for the disease based on internal factors and direct and indirect paths between the internal factors, the paths representing direct and indirect relationships therebetween;

selecting direct and indirect paths from the model using the user's intestinal flora data and the user's attribute data; and applying the model to determine the numerical value for the risk by:

calculating, for each path, a coefficient of the path, the coefficient of the path indicating a degree of correlation between the user's intestinal flora data and the user's attribute data;

confirming, for each path, the coefficient of the path, the confirming including determining whether the coefficient of the path is above a predetermined threshold value; and determining the numerical value for the risk based on the coefficients of the direct and indirect paths;

the method further comprising:

outputting an evaluation report based on the calculated risk value, the evaluation report including information relating to combined effects of the user's intestinal flora data and the user's attribute data on the risk for the disease; and generating recommendations for the user that affect the numerical value for the risk based on a combined influence of the internal factors on the risk for the disease.

12. The method of claim 11, wherein intestinal flora data of people is used as one or more of the internal factors.

13. The method of claim 11, wherein the model is a structural equation model.

14. The method of claim 11, wherein living data and environment data of people are used as internal factors.

15. An apparatus for determining a numerical value for a risk for a disease, comprising:

a computer configured to:

input one or more diseases that a user wants to evaluate whether it is at risk for;

extract the user's intestinal flora data and the user's attribute data from a database, the user's intestinal flora data being a result of analyzing a stool sample of the user;

extract, from the database, a model that is configured to calculate the numerical value for the risk for the disease based on internal factors and direct and indirect paths between the internal factors, the paths representing direct and indirect relationships therebetween;

select direct and indirect paths from the model using the user's intestinal flora data and the user's attribute data;

apply the model to calculate the numerical value for the risk by:

calculating, for each path, a coefficient of the path, the coefficient of the path indicating a degree of correlation between the user's intestinal flora data and the user's attribute data;

confirming, for each path, the coefficient of the path, the confirming including determining whether the coefficient of the path is above a predetermined threshold value; and determining the numerical value for the risk based on the coefficients of the direct and indirect paths;

output an evaluation report based on the calculated risk value, the evaluation report including information relating to combined effects of the user's intestinal flora data and the user's attribute data on the risk for the disease; and generate recommendations for the user that affect the numerical value for the risk based on a combined influence of the internal factors on the risk for the disease.

16. A system for determining a numerical value for a risk for a disease, comprising:

a computer configured to:

input one or more diseases that a user wants to evaluate whether it is at risk for;

extract the user's intestinal flora data, which is a result of analyzing a stool sample of the user, from a first database;

extract the user's attribute data from a second database;

extract intestinal flora data of people including healthy people and people with the one or more of the inputted diseases, which is a result of analyzing stool samples of the people, from the first database;

extract attribute data of the people and disease data of the people, from the second database;

create a model that calculates the risk for the disease by:

determining direct and indirect paths between internal factors including the extracted intestinal flora data of people, the extracted attribute data of the people and the extracted disease data of the people, the paths representing direct and indirect relationships between the internal factors;

for each path, calculating a coefficient of the path, the coefficient of the path representing a degree of correlation between the internal factors;

for each path, confirming the coefficient of the path, the confirming including determining whether the coefficient of the path is above a predetermined threshold value;

determining influence of each internal factor on the risk for the disease based on the coefficients of the direct and indirect paths; and associating a risk value for the disease for each path based on the determined influence;

select direct and indirect paths from the model using the user's intestinal flora data and the user's attribute data; and apply the model to calculate the numerical value for the risk by:

calculating, for each path, a coefficient of the path, the coefficient of the path indicating a degree of correlation between the user's intestinal flora data and the user's attribute data;

confirming, for each path, the coefficient of the path, the confirming including determining whether the coefficient of the path is above a predetermined threshold value; and determining the numerical value for the risk based on the coefficients of the direct and indirect paths;

the system being further configured to:
output an evaluation report based on the calculated risk value, the evaluation report including information relating to combined effects of the user's intestinal flora data and the user's attribute data on the risk for the disease; and
generate recommendations for the user that affect the numerical value for the risk based on a combined influence of the internal factors on the risk for the disease.

17. A computer executable process for determining a numerical value for a risk for a disease, the process comprising:
an input step of inputting one or more diseases that a user wants to evaluate whether it is at risk for;
a first extraction step of extracting the user's intestinal flora data, which is a result of analyzing a stool sample of the user, from a first database, and to extract the user's attribute data from a second database;
a second extraction step of extracting intestinal flora data of people including healthy people and people with the one or more inputted diseases, which is a result of analyzing stool samples of the people, from the first database, and to extract attribute data of the people and disease data of the people, from the second database;
a creation step of creating a model that calculates the risk for the disease, the creating including:
determining direct and indirect paths between internal factors including the extracted intestinal flora data of people, the extracted attribute data of the people and the extracted disease data of the people, the paths representing direct and indirect relationships between the internal factors;
for each path, calculating a coefficient of the path, the coefficient of the path representing a degree of correlation between the internal factors;
for each path, confirming the coefficient of the path, the confirming including determining whether the coefficient of the path is above a predetermined threshold value;
determining influence of each internal factor on the risk for the disease based on the coefficients of the direct and indirect paths; and
associating a risk value for the disease for each path based on the determined influence;
a selecting step of selecting direct and indirect paths from the model using the user's intestinal flora data and the user's attribute data;
an applying step of applying the model to calculate the numerical value for the risk by:
calculating, for each path, a coefficient of the path, the coefficient of the path indicating a degree of correlation between the user's intestinal flora data and the user's attribute data; and
determining the numerical value for the risk based on the coefficients of the direct and indirect paths;
the method further including:
outputting an evaluation report based on the calculated risk value, the evaluation report including information relating to combined effects of the user's intestinal flora data and the user's attribute data on the risk for the disease; and
generating recommendations for the user that affect the numerical value for the risk based on a combined influence of the internal factors on the risk for the disease.

\* \* \* \* \*